United States Patent Office 3,064,995
Patented Nov. 20, 1962

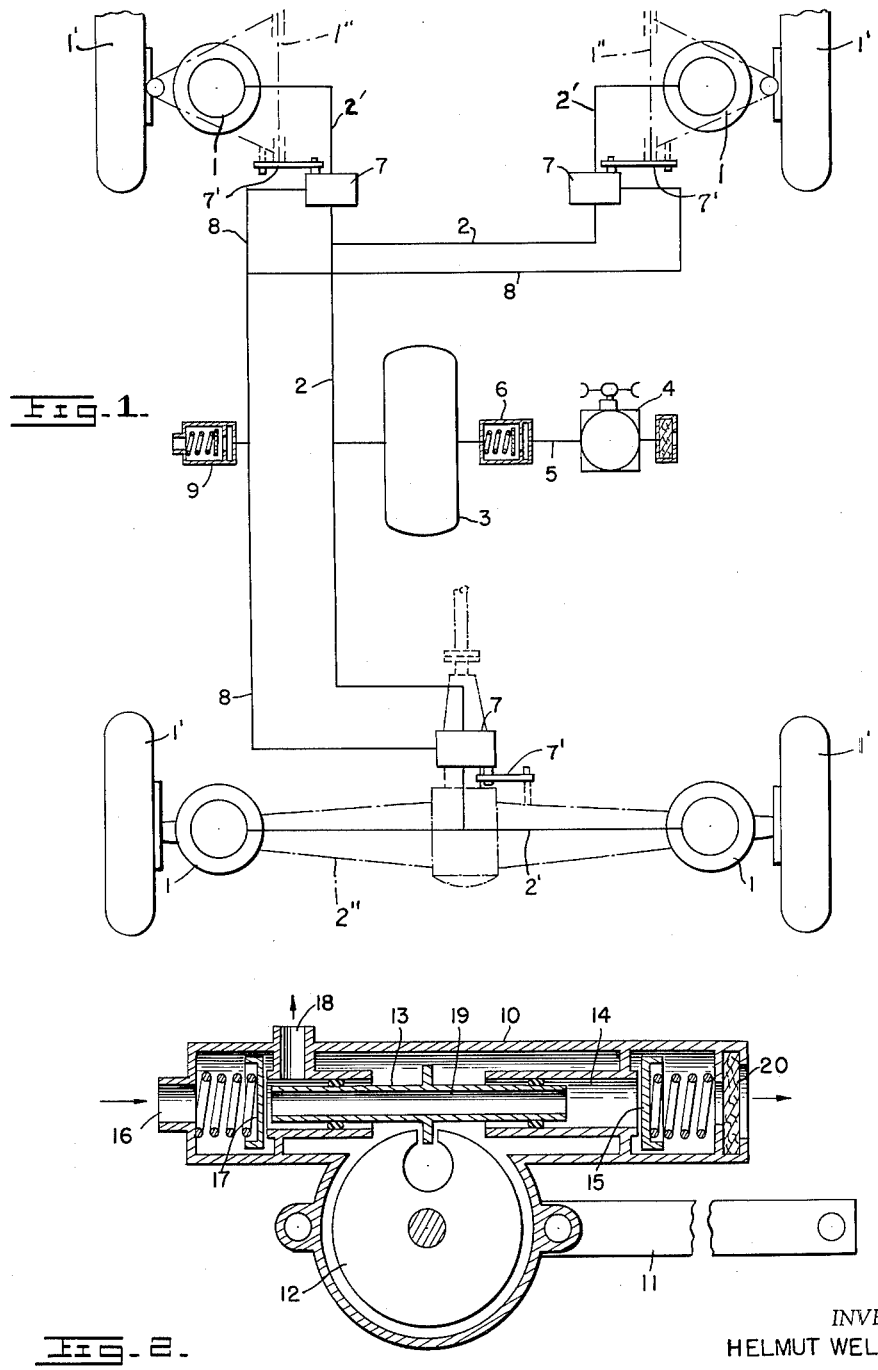

3,064,995
PNEUMATIC SPRING SYSTEM ESPECIALLY FOR MOTOR VEHICLES
Helmut Weller, Stuttgart, Germany, assignor to Daimler-Benz Aktiengesellschaft, Stuttgart-Untertürkheim, Germany
Filed May 18, 1959, Ser. No. 813,876
Claims priority, application Germany May 24, 1958
1 Claim. (Cl. 280—124)

The present invention relates to a pneumatic spring system, especially for motor vehicles provided with an open regulating or adjusting system in which air is drawn or sucked in from the atmosphere by a compressor, is conducted after control thereof by a height-control member to the individual spring elements and in which the excess air is discharged from the spring elements into the atmosphere also after control thereof by the height-control or adjusting member.

So-called open regulating or adjusting systems with pneumatic spring systems offer the advantage as compared to the so-called closed adjusting systems of a simple construction, however, they entail the disadvantage with respect thereto of a larger requirement for fresh air as a result of changing loads and losses during spring movements. In order to reduce the disadvantages of the so-called open regulating systems at least partially, the present invention essentially proposes to provide the outlet or discharge sides of the height-adjusting or control members with an excess pressure valve which is adjusted approximately to the pressure prevailing in the system that corresponds to the pressure of the unloaded vehicle. By the use of such an arrangement, it is possible to achieve a considerable reduction or minimization of the air losses which occur as a result of the spring movements of the vehicle because the pressure difference which is determinative of the air losses is thereby considerably reduced.

According to another feature in accordance with the present invention, the outlet sides of all of the height-adjusting or control members of the vehicle may be advantageously interconnected with each other by lines which lead to a single excess pressure valve.

Accordingly, it is an object of the present invention to provide a pneumatic spring system, especially for motor vehicles, in which the advantages obtainable with the open pneumatic control system are maintained while at the same time reducing or minimizing the disadvantages resulting therefrom.

Another object of the present invention resides in the provision of means in an open pneumatic spring system to reduce the losses of the pneumatic medium within the system due to spring movement or changes in load of the vehicle.

A further object of the present invention resides in the provision of a height-adjusting device which is provided with an excess or pressure relief valve so adjusted that it is not responsive to open the discharge unless the pressure within the system exceeds the pressure normally required for the unloaded vehicle.

Still another object of the present invention resides in the provision of an adjusting member for adjusting the height of the pneumatic spring system which is simple in construction, reliable in operation and which enables the attainment of the advantages and elimination of the disadvantages mentioned hereinabove.

These and other objects, features and advantages of the present invention will become more obvious from the following description when taken in connection with the accompanying drawing which shows, for purposes of illustration only, two embodiments in accordance with the present invention and wherein:

FIGURE 1 is a schematic, diagrammatic view of a pneumatic spring system provided with height-adjusting members interconnected with each other and leading to a common excess pressure valve in accordance with the present invention; and FIGURE 2 is a partial longitudinal cross-sectional view through a modified embodiment of a height-adjusting member provided with an individual excess pressure valve in the discharge thereof in accordance with the present invention.

Referring now to the drawing, and more particularly to FIGURE 1, the pneumatic spring system schematically illustrated therein includes in connection with a motor vehicle (not shown) a plurality of schematically illustrated pneumatic springs each designated by reference numeral 1 and coordinated to or operatively connected with a respective vehicle wheel 1' of the motor vehicle. The pneumatic spring system shown in FIGURE 1, in addition to the pneumatic spring elements 1, which may be of any suitable and appropriate construction, includes lines or ducts 2' operatively connecting the individual spring elements 1 with the height-adjusting devices 7 and lines or ducts 2 operatively connecting the height-adjusting devices 7 with the storage tank or reservoir 3 into which air under pressure is supplied from the compressor 4 of any suitable construction over line 5 and check valve 6 arranged therein. The height-adjusting members indicated in block diagram and designated by reference numeral 7 are interconnected into the line system 2, 2' so as to control the individual spring elements 1 by adjusting the pressure within the springs. The height-adjusting elements 7 may be of any suitable construction known in the prior art and, therefore, are only shown in block diagram. Moreover, instead of utilizing individual height-adjusting elements for the two front wheels and a single height-adjusting element for the two rear wheels, it is understood that individual height-adjusting elements for each wheel may be used.

The height-adjusting elements 7 are operative to control, in dependence on the prevailing height of the vehicle body over the respective vehicle axle member, either the supply of pneumatic medium or pressurized air from the storage tank 3 to the individual pneumatic springs 1 or the discharge of the pneumatic medium from the pneumatic springs 1 into the atmosphere. As illustrated schematically in FIGURE 1, the single height adjusting element 7 for the two rear wheels is adjusted by a control means 7' in dependence on the distance between the element 7 which is secured to the line system 2 and the rear axle 2''. The front wheels are provided with independent suspension means which are controlled independently by separate control means 7'. In order to prevent excessive losses of the air within the system, lines or conduits 8 are operatively connected with each outlet or discharge side of each height-adjusting device 7 which lead to a common excess pressure valve 9 operative to open only above a certain pressure. The common excess pressure valve 9 is adjusted to the pressure of the pneumatic spring system which corresponds to the unloaded vehicle. In that manner, the air losses during spring movements are effectively limited notwithstanding the use of an open regulating system.

Instead of a common excess pressure valve 9, as illustrated in FIGURE 1, used in connection with all of the height-adjusting elements 7 of the pneumatic spring system of the vehicle, each height-adjusting device 7 may be provided with a separate, individual excess pressure valve at the discharge side thereof.

As illustrated in FIGURE 2, illustrating a height-adjusting element 10 provided with an adjusting arm 11, with an adjusting member 12 and with a control piston member 13, an excess pressure valve 15 is arranged at the outlet side or discharge side 14 thereof which is adjusted to the pressure that the unloaded vehicle body exerts on the pneumatic springs 1. The arm 11 is operatively connected between element 10 and a respective wheel support means and pivots in response to movements between the element 10 and the wheel support means to control the element in dependence on the prevailing height of the vehicle body of the respective wheel support means. Pivoting of arm 11 rotates the member 12 and thereby moves the piston member 13. In the embodiment of FIGURE 2, a plate valve 17 is arranged at the inlet side 16 which is controlled by the piston member 13. The plate valve 17, in the opened position thereof, establishes a communication between the input side 16 thereof operatively connected with the storage tank 3 (not illustrated in FIGURE 2) and line 18 leading to a respective pneumatic spring to be adjusted. If the control piston 13 moves toward the right, as viewed in FIGURE 2, then air or pneumatic medium may flow from the pneumatic spring over line 18 and through control bore 19 within the control piston 13 to the excess pressure valve 15 so as to act thereon. If the pressure in the respective pneumatic spring is greater than the pressure that would exist therein with the vehicle unloaded, which is the pressure to which the excess pressure valve 15 is adjusted, then the air or pneumatic medium may escape from the pneumatic spring into the atmosphere through the excess pressure valve 15 and through the filter 20 operatively connected therebetween. The pressure drop which is determinative for the discharge of the air or of the pneumatic medium during spring movements is considerably reduced by the presence of the excess pressure valve 15 or 9.

While I have shown and described two embodiments in accordance with the present invention, it is understood that the same is not limited thereto but is susceptible of many changes and modifications within the spirit and scope of the present invention, and, I therefore, do not wish to be limited to the details described and illustrated herein but intend to cover all such changes and modifications as are encompassed by the scope of the appended claim.

What is claimed is:

A pneumatic spring system for motor vehicles having a plurality of wheels, comprising pneumatic spring means for each said wheel, means for providing pressure air for said spring means including a compressor having an outlet and an intake means connected to the atmosphere, and an open regulating system for controlling the pressure in said pneumatic spring means consisting of conduit means operatively connecting said compressor outlet with each of said pneumatic springs means, a plurality of height-adjusting means arranged in said conduit means for controlling the supply of air to and from the pneumatic spring means and the discharge of excess pressure air from said pneumatic spring means, each said height-adjusting means including a piston-cylinder assembly, said cylinder being operatively connected in said conduit means operatively connecting the compressor with said pneumatic spring means, an inlet opening and two discharge openings for said cylinder means, valve means arranged in said inlet opening and one of said discharge openings, the discharge valve means forming an excess pressure valve means for enabling the discharge of excess pressure air from said pneumatic spring means, said piston being slidable in said cylinder to directly control said inlet valve means and having a control bore extending therethrough, said piston being sealed with respect to said cylinder adjacent said discharge valve means whereby the discharge valve means is controlled by compressed air flowing through said control bore, the flow of compressed air through said control bore being controlled by the placement of said piston with respect to said inlet valve means, said excess pressure valve means being adjusted approximately to the pressure prevailing in the pnuematic spring means corresponding to the pressure prevailing therein with an essentially unloaded vehicle for limiting the amount of air discharged and means for controlling movement of said piston axially of said cylinder including an abutment surface on said piston between the ends thereof, a rotatable member operatively abutting said surface whereby rotation of said member moves said piston axially of said cylinder, and means for rotating said member in response to changes in the prevailing height of the body of the vehicle.

References Cited in the file of this patent

UNITED STATES PATENTS

| | | |
|---|---|---|
| 2,787,475 | Jackson | Apr. 2, 1957 |
| 2,844,386 | Pribonic | July 22, 1958 |
| 2,848,249 | Bertsch | Aug. 19, 1958 |
| 2,945,701 | Dietrich | July 19, 1960 |
| 2,969,975 | Chuba | Jan. 31, 1961 |

OTHER REFERENCES

SAE Journal publication, February 1958, pages 51 and 52.